(12) United States Patent
Makiuchi et al.

(10) Patent No.: US 7,642,681 B2
(45) Date of Patent: Jan. 5, 2010

(54) ROTARY ELECTRIC MACHINE EQUIPPED WITH ONE OR MORE MAGNETIC SENSORS

(75) Inventors: Kazuhiro Makiuchi, Nagano (JP); Akira Shimizu, Nagano (JP); Sakae Kishi, Shiga (JP)

(73) Assignee: Sanyo Denki Co., Ltd., Tokyo (JP)

( * ) Notice: Subject to any disclaimer, the term of this patent is extended or adjusted under 35 U.S.C. 154(b) by 464 days.

(21) Appl. No.: 11/466,649

(22) Filed: Aug. 23, 2006

(65) Prior Publication Data

US 2007/0046122 A1    Mar. 1, 2007

(30) Foreign Application Priority Data

Aug. 25, 2005 (JP) .............................. 2005-244872

(51) Int. Cl.
*H02K 11/00*    (2006.01)
(52) U.S. Cl. ............... 310/67 R; 310/68 B; 310/51; 360/99.04; 360/99.07; 360/99.08
(58) Field of Classification Search ............... 310/67 R, 310/51, 68 B; 360/99.04, 99.07, 99.08
See application file for complete search history.

(56) References Cited

U.S. PATENT DOCUMENTS

| | | | |
|---|---|---|---|
| 5,864,192 A | | 1/1999 | Nagate et al. |
| 6,700,240 B2 | * | 3/2004 | Akiwa ..................... 310/67 R |
| 6,713,912 B1 | * | 3/2004 | Kuwert et al. ................. 310/89 |
| 6,919,657 B2 | * | 7/2005 | Horng et al. .............. 310/67 R |
| 2006/0214532 A1 | * | 9/2006 | Shirai .......................... 310/216 |

FOREIGN PATENT DOCUMENTS

| | | |
|---|---|---|
| JP | 63-274394 | 11/1988 |
| JP | 08-172763 | 7/1996 |
| JP | 08-289518 | 11/1996 |
| JP | 09-037512 | 2/1997 |
| JP | 10-108441 | 4/1998 |
| JP | 2004-208381 | 7/2004 |
| JP | 2005-057855 | 3/2005 |

* cited by examiner

*Primary Examiner*—Quyen Leung
*Assistant Examiner*—Leda Pham
(74) *Attorney, Agent, or Firm*—Rankin, Hill & Clark LLP

(57) ABSTRACT

The present invention provides a rotary electric machine, in which it is possible to reduce the dimension of a casing in a direction along a rotation center line. The rotary electric machine comprises a magnet rotor 2 rotating about a rotation center line 1 and one or more magnetic sensors 11 for detecting leakage flux leaking out of the magnet rotor 2. The magnet rotor 2 and a stator 3 are received in a casing 4. A sensor receiving portion 12 for receiving the one or more magnetic sensors 11 is disposed in an outer wall portion of a side wall of the casing 4 located in an extending direction of the rotation center line 1 of the magnet rotor 2. The one or more magnetic sensors 11 are received in the sensor receiving portion 12. The sensor receiving portion 12 is disposed in a position that allows the one or more sensors to detect leakage flux leaking out of the magnet rotor 2.

5 Claims, 6 Drawing Sheets

ROTARY ELECTRIC MACHINE EQUIPPED WITH ONE OR MORE MAGNETIC SENSORS

FIELD OF THE INVENTION

The present invention relates to a rotary electric machine equipped with one or more magnetic sensors and a flat-type electric motor equipped with one or more sensors.

BACKGROUND OF THE INVENTION

For example, a conventional electric motor equipped with one or more magnetic sensors typically includes a stator, a magnet rotor, and magnetic sensors, all of which are received in a casing, and the sensors sense leakage flux leaking out of the magnet rotor to detect a rotational speed, angle of rotation, etc. of the magnet rotor, as disclosed in Japanese Patent Application Laid-open Publication No. 09-37512 and Japanese Patent No. 2699655, FIG. 1.

A typical example of the magnetic sensor includes a Hall element and Hall IC.

However, in the rotary electric machine equipped with one or more sensors of the foregoing structure, since a magnetic sensor and a support structure for supporting the magnetic sensor such as a circuit substrate are both received within the casing, the dimension of the casing in an extending direction of the rotation center line of the magnet rotor (that is, an axial direction) inevitably becomes long. As a result, it is impossible to make the machine thinner.

Moreover, since the casing has to be opened when the maintenance inspection of the circuit substrate is needed, it is not easy to perform the maintenance inspection of the circuit substrate in a short time.

SUMMARY OF THE INVENTION

An object of the present invention is to provide a rotary electric machine in which it is possible to reduce the dimension of a casing in a direction along the rotation center line of a magnet rotor.

Another object of the present invention is to provide a rotary electric machine in which it is easy to determine where to dispose one or more magnetic sensors with respect to the rotary electric machine.

A further object of the present invention is to provide a rotary electric machine in which even a plurality of magnetic sensors can easily be received.

Still another object of the present invention is to provide a rotary electric machine in which remarkable lowering of mechanical strength of the casing is not caused by disposing a sensor receiving portion in the casing.

Yet another object of the present invention is to provide a rotary electric machine in which an electrical short circuit is not caused by disposing one or more sensors outside the casing.

Even another object of the present invention is to provide a flat-type electric motor in which it is possible to reduce the dimension of the casing in the direction along the rotation center line of the magnet rotor.

A rotary electric machine of the present invention comprises a stator, a magnet rotor rotating about a rotation center line, one or more magnetic sensors for detecting leakage flux leaking out of the magnet rotor, and a casing. The magnet rotor and the stator are received in the casing. It is enough if the casing can receive the main parts of the magnet rotor and the stator and it is not necessary that the casing can completely encompass the stator and the magnet rotor. For example, when a rotary electric machine is constructed in such a manner that the stator core of the stator is equipped with a pair of end caps at both sides thereof, the paired end caps work as a casing. In the present invention, a sensor receiving portion is formed in an outer wall portion of a side wall of the casing, and the side wall is located in an extending direction of the rotation center line of the magnet rotor. The one or more magnetic sensors are received in this sensor receiving portion. The sensor receiving portion is disposed in a position that allows the one or more sensors to detect the leakage flux leaking out of the magnet rotor.

With this arrangement, the one or more magnetic sensors are all disposed outside the casing. As a result, the dimension of the casing in a direction along the rotation center line of the magnet rotor can be reduced. Accordingly, it becomes possible to make a rotary electric machine thin or flat. As well, since the sensor receiving portion is disposed in the position that allows the one or more sensors to detect the leakage flux leaking out of the magnet rotor, the leakage flux leaking out of the magnet rotor can be reliably detected by the one or more magnetic sensors disposed outside the casing.

The one or more magnetic sensors can be mounted onto a circuit substrate in such a manner that the magnetic sensors may be received in the sensor receiving portion with the circuit substrate being attached to the outer wall portion. In this manner, attachment or positioning of the one or more magnetic sensors with respect to the rotary electric machine can easily be performed merely by attaching the circuit substrate including the one or more magnetic sensors to the outer wall portion of the casing. Also, the main part of the rotary electric machine including the casing can be manufactured separately from the circuit substrate with magnetic sensors in different production processes. Therefore, the rotary electric machine can readily be manufactured based on division of work. In addition, rotary electric machines of different specifications (for example, the number of the magnetic sensors differs) can be manufactured easily simply by changing the circuit substrate to be used. Further, since separation of the circuit substrate with magnetic sensors from the casing becomes easy, replacement of the magnetic sensors becomes possible. The sensor receiving portion may be formed into a recess by depressing the outer wall portion of the side wall of the casing. When such a recess constitutes the sensor receiving portion, the magnetic sensors can be received within this recess, which can reduce the dimension of the rotary electric machine, equipped with magnetic sensors, in the direction of the rotation center line.

When two or more magnetic sensors are used, in order to avoid lowering of the mechanical strength of the side wall of the casing as much as possible, it is preferred to provide a sensor receiving portion for each of a plurality of the magnetic sensors. Of course, one sensor receiving portion may be provided for all of a plurality of the magnetic sensors. When one sensor receiving portion is provided for all of a plurality of the magnetic sensors, the sensor receiving portion can be formed easily. In this case, if the sensor receiving portion is constituted by an arc-shaped recess centering on the rotation center line, a plurality of the magnetic sensors can be disposed along the rotation direction of the magnet rotor.

When the sensor receiving portion is constructed into a recess having a closed end, a through-hole is not formed in the casing. Therefore, it is not necessary to take into consideration significant lowering of the mechanical strength of the casing. It is also possible to hermetically seal the casing depending on a structure of the casing.

At least a part of the casing may be made of an insulating resin. Since the insulating resin is a nonmagnetic material, it does not affect detection of the leakage flux generated from permanent magnets of the magnet rotor. In addition, even when the magnetic sensors and the circuit substrate are disposed outside the casing, it is not necessary to take into consideration electrical insulation between circuits or electrical components on the circuit substrate and the casing.

When the present invention is applied to a flat-type electric motor, it will become possible to make the body of the electric motor flatter than that of the conventional electric motor. In the rotary electric machine of the present invention, one or more magnetic sensors are all disposed outside the casing, which can reduce the dimension of the casing in a direction of the rotation center line of the magnet rotor. As a result, such an advantage can be obtained that a thinner or flatter configuration of a rotary electric machine can be realized. As well, since the sensor receiving portion is disposed in the position that allows the one or more sensors to detect leakage flux leaking out of the magnet rotor, the one or more magnetic sensors placed outside the casing can detect reliably the leakage flux leaking out of the magnet rotor.

BRIEF DESCRITION OF THE DRAWINGS

FIG. 1 shows a first preferred embodiment of a rotary electric machine according to the present invention.

FIG. 4 is a second preferred embodiment of a rotary electric machine according to the present invention.

DETAILED DESCRIPTION OF THE PREFERRED EMBODIMENTS

The present invention will now be described in detail with reference to the accompanying drawings showing preferred embodiments of the present invention. In each embodiment, a rotary electric machine of the present invention is applied to a flat-type electric motor.

Figure 1A:
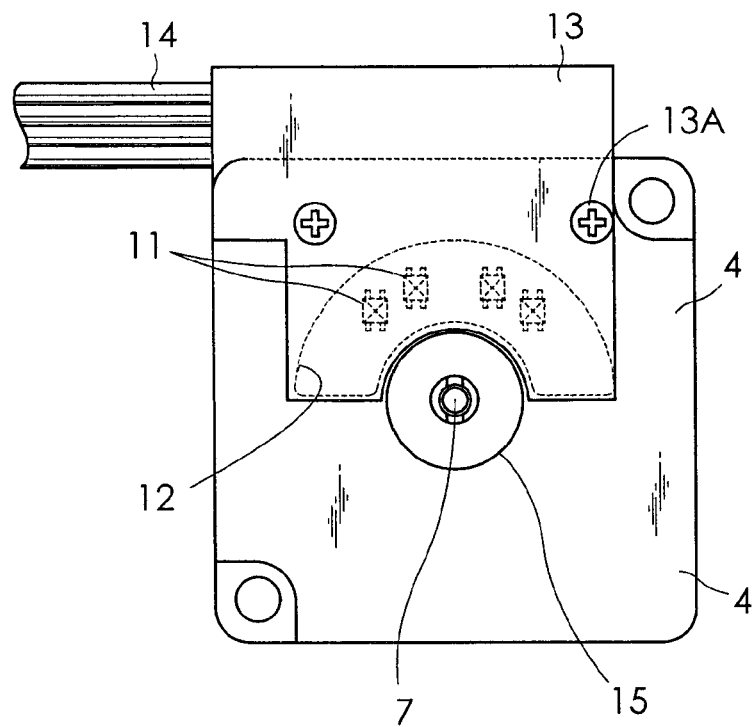
FIG. 1A is a plan view of a flat-type electric motor of this embodiment and FIG. 1B is a vertical sectional view of FIG. 1A.
Figure 1B:
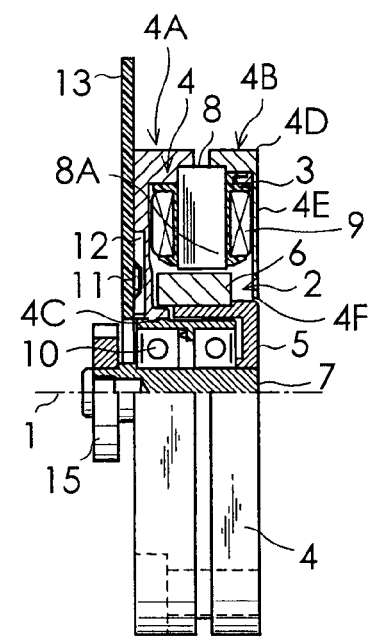
Figure 2:
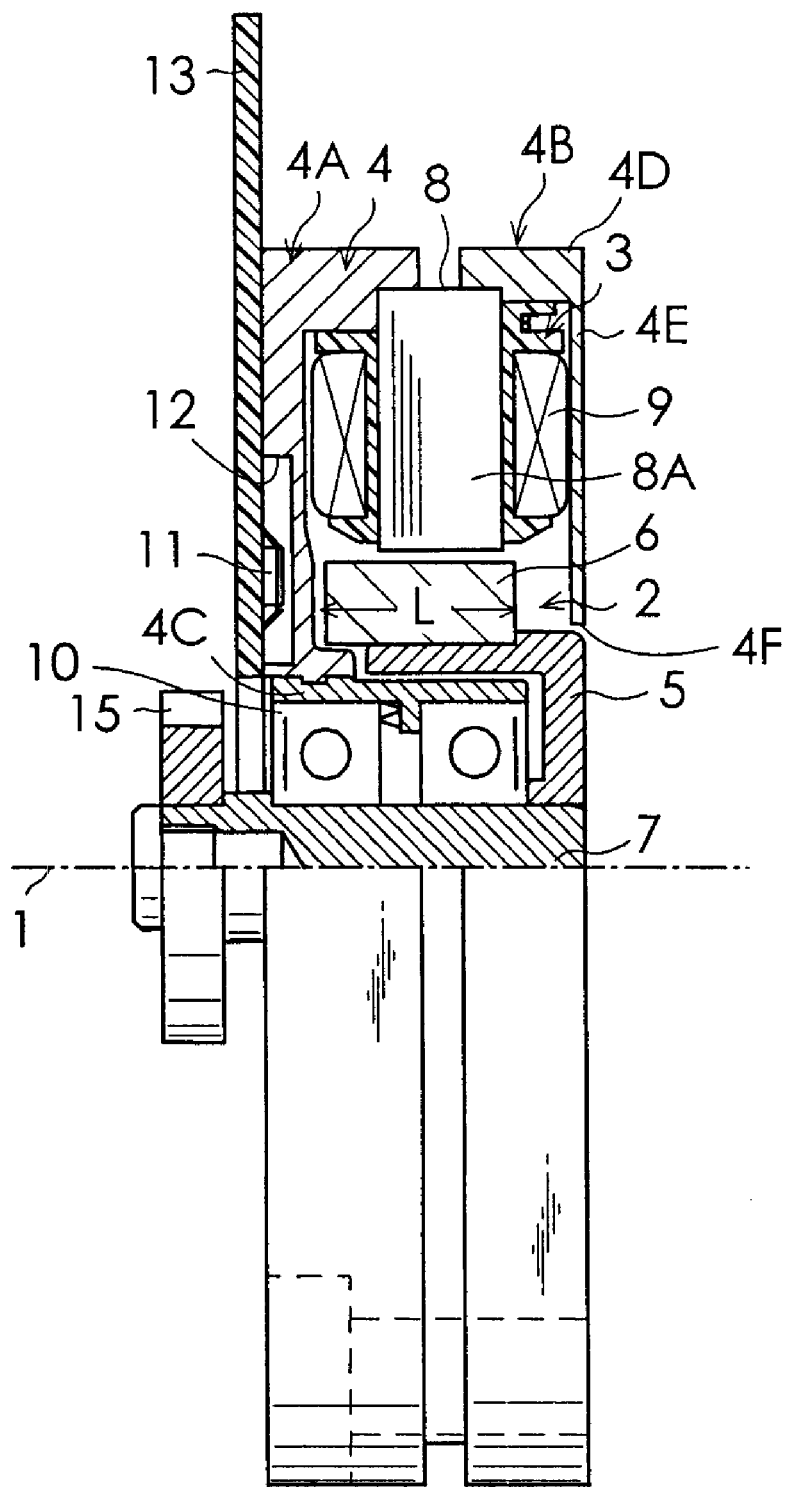
FIG. 2 is an enlarged view of FIG. 1B.
Figure 3:
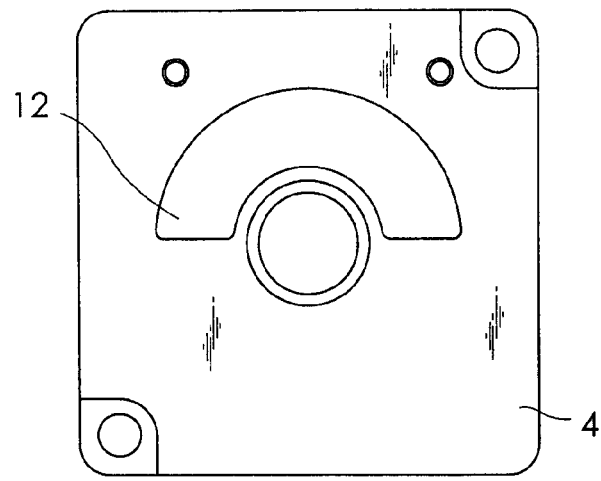
FIG. 3 is a plan view of a casing used in the first embodiment.

FIGS. 1A and 1B through FIG. 3 show a first preferred embodiment of a flat-type electric motor. FIG. 1A is a plan view of the flat-type electric motor of this embodiment, and FIG. 1B is a vertical sectional view of the motor shown in FIG. 1A. FIG. 2 is an enlarged view of FIG. 1B, and FIG. 3 is a plan view of a casing used in this embodiment.

In the flat-type electric motor of this embodiment, a magnet rotor 2 rotating about a rotation center line 1 and a stator 3 are received in a casing 4. The casing 4 of this embodiment is composed of two end caps 4A and 4B. The end cap 4A includes a cylindrical bearing holder 4C in its central portion. The other end cap 4B is composed of a ring member 4D and a plate-like member 4E. The ring member 4D is fitted with a stator core 8 and the plate-like member 4E is integrally disposed with the ring member 4D to cover an opening of the ring member 4D. The plate-like member 4E includes a window 4F for exposing a part of a rotor yoke 5 of the magnet rotor. The end cap 4A is made of a non-magnetic metal such as aluminum, so that leakage flux leaking out of a permanent magnet 6 of the magnet rotor 2 can transmit therethrough. Materials of the ring member 4D and plate-like member 4E of the end cap 4B can be chosen freely, and they may be made of, for example, magnetic materials, such as iron, in order to shut off the leakage flux in a direction to the right of the motor of FIG. 2.

The magnet rotor 2 is constructed in such a manner that a plurality of permanent magnets 6 are fixed onto an outer circumferential portion of a cup-like rotor yoke 5. The rotor yoke 5 is fixed to one end of a rotation shaft 7. The stator 3 includes a plurality of salient poles 8A disposed at a predetermined interval in a circumferential direction on an inner circumferential portion of an annular yoke of the stator 3. Stator windings 9 are wound onto each of the plurality of salient poles 8A of the stator core 8. A rotation shaft 7 is rotatably supported by two bearings 10 arranged in a bearing holder 4C integrally formed with the end cap 4A of the casing 4. The length L in an axial direction of each of the plurality of permanent magnets 6 is determined so that one end face of the permanent magnet 6 in the axial direction may approach an inner wall portion of the end cap 4A as closely as possible, as a magnetic pole face of each of the salient poles 8A of the stator core 8 is completely opposed to the permanent magnet 6.

In order to detect leakage flux leaking out the permanent magnets 6 of the magnet rotor 2 and to acquire information including the rotating position, speed, etc. of the magnet rotor, the motor of this embodiment is equipped with four magnetic sensors 11. Each of the magnetic sensors 11 detects the leakage flux leaking out of the rotating permanent magnets 6. The output of each of the magnetic sensors 11 is processed by a signal processing circuit disposed in a circuit substrate 13, and information including the rotational frequency, angle of rotation, etc. of the magnet rotor 2 is detected.

In order to allow each of the magnetic sensors 11 to easily detect the leakage flux as mentioned above, the portion of each of the permanent magnets 6 that is located to the side of the magnetic sensor is made longer than the portion of each of the permanent magnet that is opposed to the stator core 8. A Hall element is used for each of the magnetic sensors 11 in this embodiment. A sensor receiving portion 12 in which the four magnetic sensors 11 are received is formed in a side wall of the casing 4, i.e., an outer wall portion of the end cap 4A which is located in an extending direction of the rotation center line 1 of the magnet rotor 2 (in one of the extending directions of the axial line). The sensor receiving portion 12 is formed by depressing the outer wall portion of the end cap 4A to form a recess having a closed end. The sensor receiving portion 12 which is constituted by the recess is opened toward one of the extending directions of the axial line. The sensor receiving portion 12 has a circular-arc shape centering on the rotation center line 1. As in this embodiment, when the sensor receiving portion 12 is formed into a recess, leakage flux leaking out of the permanent magnets 6 of the magnet rotor 2 can be detected although the recess has a closed end.

Each of the magnetic sensors 11 is mounted on the circuit substrate 13 along an arc-shaped line centering on the rotation center line 1 of the magnet rotor 2. The four magnetic sensors are mounted on the circuit substrate 13 so that each of the magnetic sensors 11 may be received within the sensor receiving portion 12 with the circuit substrate 13 being attached to the outer wall portion of the casing 4 with screws 13A. The face of the circuit substrate 13 opposed to the outer wall portion of the end cap 4A which constitutes a part of the casing 4 is covered with an insulating resin layer for protecting printed electric elements and electric conduction patterns existing on the surface of the circuit substrate 13. For this reason, even if the circuit substrate 13 touches the outer wall portion of the end cap 4A, an electrical short circuit is not immediately caused. A flat cable 14 is connected to the circuit substrate 13. Lead wires of the exciting windings 9 are pulled out to the outside of the casing through a through-holes (not illustrated) arranged in a peripheral wall of the end cap 4A, and are soldered to electrodes disposed on the circuit substrate 13.

In this embodiment, a gear 15 is attached to the other end of the rotation shaft 7 as means for taking out a rotational output from this motor. As another means of taking out a rotational output from the motor, a tap and a slot may be formed on an axial end face of the rotation shaft 7 in order to make it possible to install a load to the axial end face.

In the above arrangement, the four magnetic sensors 11 are all disposed outside the casing 4 (the end cap 4A). As a result, the dimension between two outer walls of the end caps 4A, 4B (that means, an outline dimension of the electric motor body in the axial direction) can be reduced and an electric motor can be made flat. In the above-mentioned embodiment, the sensor receiving portion 12 is located in a position opposed to the axial end face of the permanent magnets 6 of the magnet rotor 2 and the thickness of a base wall portion of the recess constituting the sensor receiving portion 12 is made as thin as possible in order to prevent the mechanical strength of the base wall portion from being lowered. Therefore, even if the four magnetic sensors 11 are disposed outside the end cap 4A, the leakage flux leaking out of the permanent magnets of the magnet rotor 2 can be sufficiently detected. In this embodiment, since the four magnetic sensors 11 are mounted onto the circuit substrate 13, the magnetic sensors 11 can be received in the sensor receiving portion 12, and can be appropriately positioned with respect to the permanent magnets 6 simply by attaching the circuit substrate 13 to the outer wall portion of the end cap 4A.

In this embodiment, one sensor receiving portion 12 is provided for all of the four magnetic sensors 11. Therefore, the sensor receiving portion 12 is formed simply. Moreover in this embodiment, since the sensor receiving portion 12 is constituted by an arc-shaped recess centering on the rotation center line 1, the four magnetic sensors 11 can be disposed along the rotation direction of the magnet rotor 2.

Figure 4A:
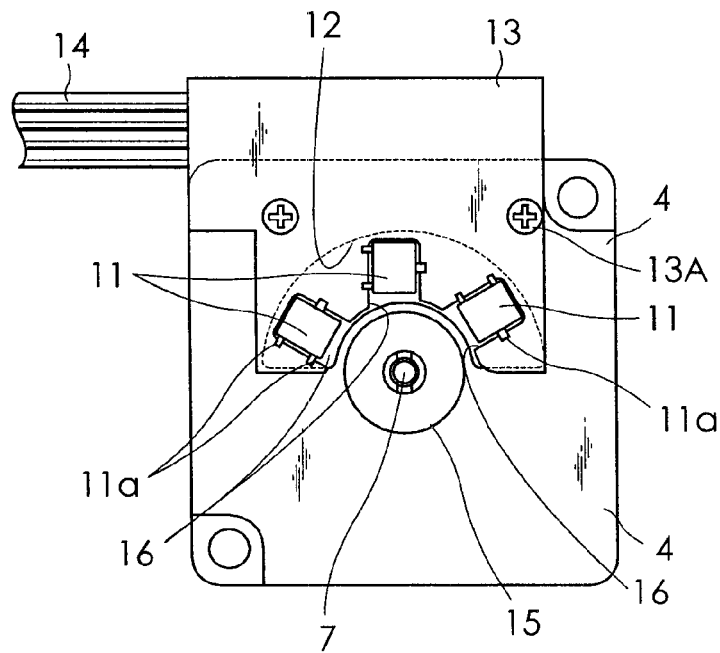
FIG. 4A is a plan view of a flat-type electric motor of this embodiment.
Figure 4B:
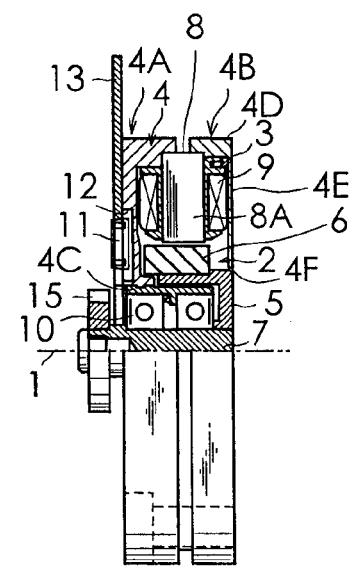
FIG. 4B is a vertical sectional view of FIG. 4A.

FIGS. 4A and 4B show a second preferred embodiment of a rotary electric machine according to the present invention. FIG. 4A is a plan view of a flat-type electric motor, and FIG. 4B is a vertical sectional view of FIG. 4A. Parts same as those in FIGS. 1A and 1B through FIG. 3 are given the same reference numerals.

In the flat-type electric motor of this embodiment, a Hall IC, which is provided with a hall element and a signal processing circuit, is used as each of a plurality of magnetic sensors 11 (in this embodiment, three magnetic sensors). The package of the magnetic sensor 11 constituted by these Hall ICs is high in height compared with a hall element, and the shape is large. As with the first embodiment, if the Hall IC is mounted on the rear face of the circuit substrate 13, it is necessary to make deeper the depth of the recess of the sensor receiving portion 12. So, in this embodiment, a plurality of slots 16 (three slots in this embodiment) are formed in the circuit substrate 13 where the magnetic sensors 11 are to be mounted. Each Hall IC is inserted into the rear face of the circuit substrate 13, and terminals 11a of the Hall IC are soldered and connected to an electrode disposed on the rear face of the circuit substrate 13. Other constitutions are the same as those of the first embodiment.

With this arrangement, even when the shape dimension of the magnetic sensor 11 becomes larger, it is not necessary to make the recess of the sensor receiving portion 12 deeper than necessary (not to the extent that the mechanical strength is extremely reduced).

Figure 5:
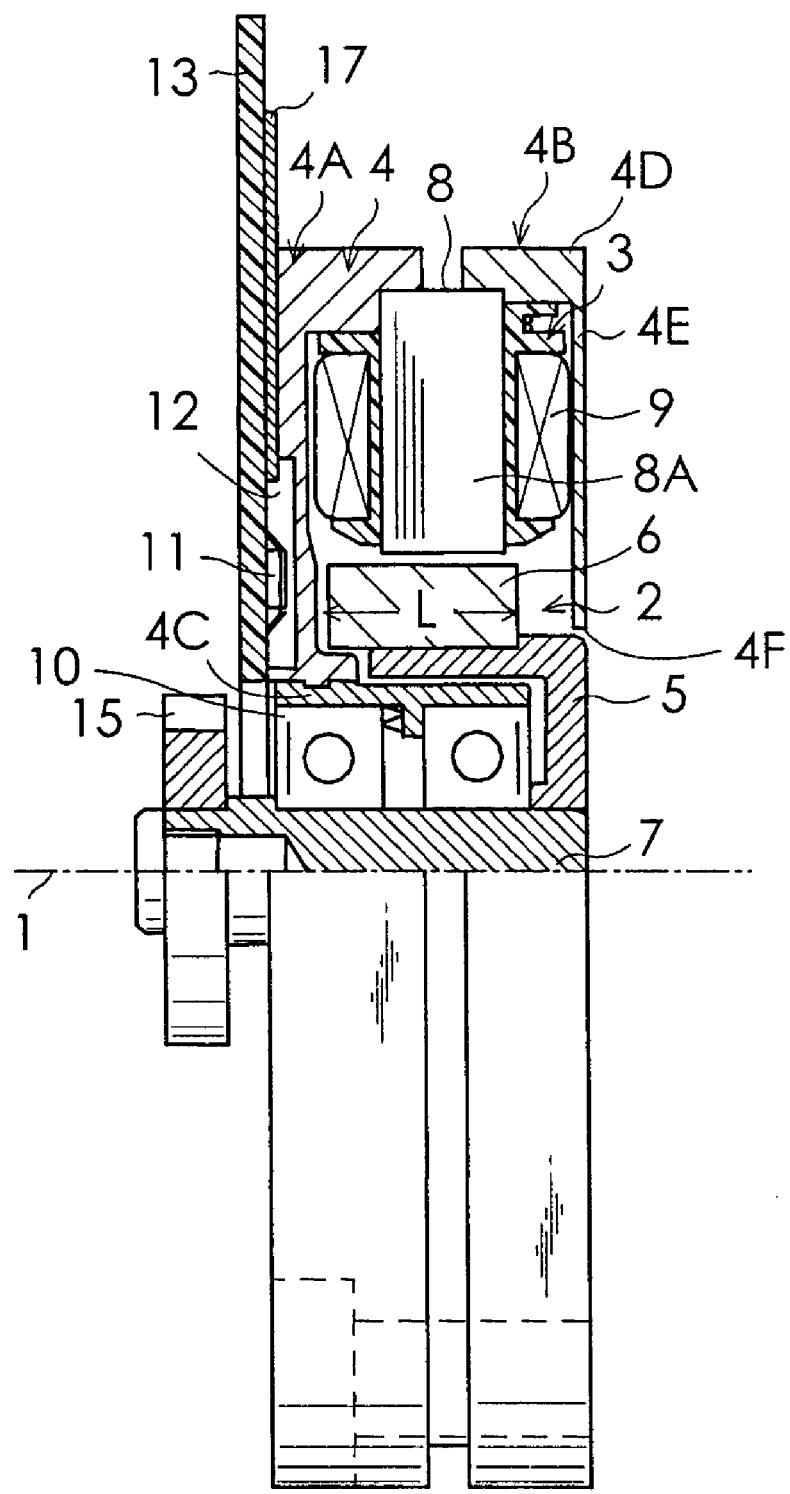
FIG. 5 is a vertical sectional view showing a third preferred embodiment of a rotary electric machine according to the present invention.

FIG. 5 is a vertical sectional view showing a third preferred embodiment of a rotary electric machine according to the present invention. Parts corresponding to those shown in FIGS. 1A, 1B through FIG. 3 are given the same reference numerals and their descriptions are omitted. In a flat-type electric motor of this embodiment, an end cap 4A of a casing 4 is also made of non-magnetic metals, such as aluminum. In order to provide electrical insulation between the end cap and electric conduction patterns or printed electronic elements disposed on the circuit substrate 13, an insulating layer 17 is provided to intervene between the casing 4 and the circuit substrate 13. The insulating layer 17 may be composed of an insulating coating layer formed by, for example, applying an insulating resin on the surface of the circuit substrate 13. The insulating layer 17 may also be constituted by sticking an insulating sheet having an adhesive layer on its contact surface onto the circuit substrate 13. As a matter of course, the insulating layer may be formed in the end cap 4A on a surface area opposed to the circuit substrate 13 by sticking an insulating sheet or by applying an insulating resin thereon.

Figure 6:
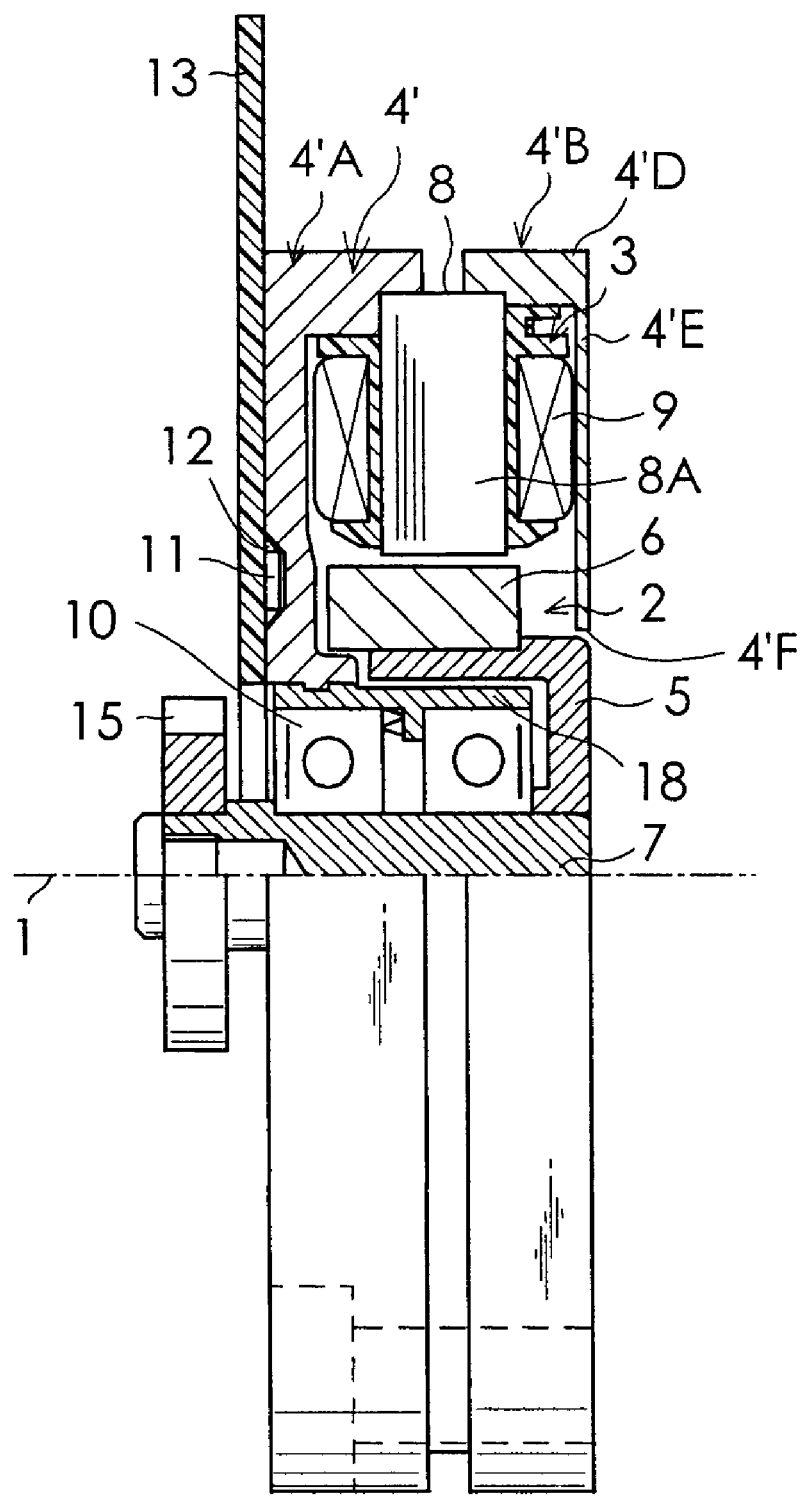
FIG. 6 is a vertical sectional view showing a fourth preferred embodiment of a rotary electric machine according to the present invention.

FIG. 6 is a vertical sectional view showing a fourth preferred embodiment of a rotary electric machine according to the present invention. Parts same as those shown in FIGS. 1A and 1B through FIG. 3 are given the same reference numerals and their descriptions are omitted. In a flat-type electric motor of this embodiment, an end cap 4'A constituting a part of a casing 4' is integrally made of an insulating resin material by integral formation. Accordingly, a metal bearing holder 18 is being fixed to a through-hole formed in a central portion of the end cap 4'A. The bearing holder is integrally formed with the end cap 4'A made of an insulating resin by insert molding. If the end cap 4'A is made of an insulating material as with this embodiment, it is not necessary to provide an insulating layer 17 between the circuit substrate 13 and the end cap 4'A as shown in FIG. 5 of this embodiment. In addition, if it is not necessary to provide the insulating layer on the circuit substrate 13, the manufacturing cost of the circuit substrate 13 can be reduced.

If the end cap 4'A is made of an insulating resin material, the end cap 4'A does not give any effect to the detection of the leakage flux generated from the permanent magnets 6. Further, even if the magnetic sensors 11 are disposed on the circuit substrate 13 outside the end cap 4'A, an electric short circuit is not caused at all.

Figure 7:
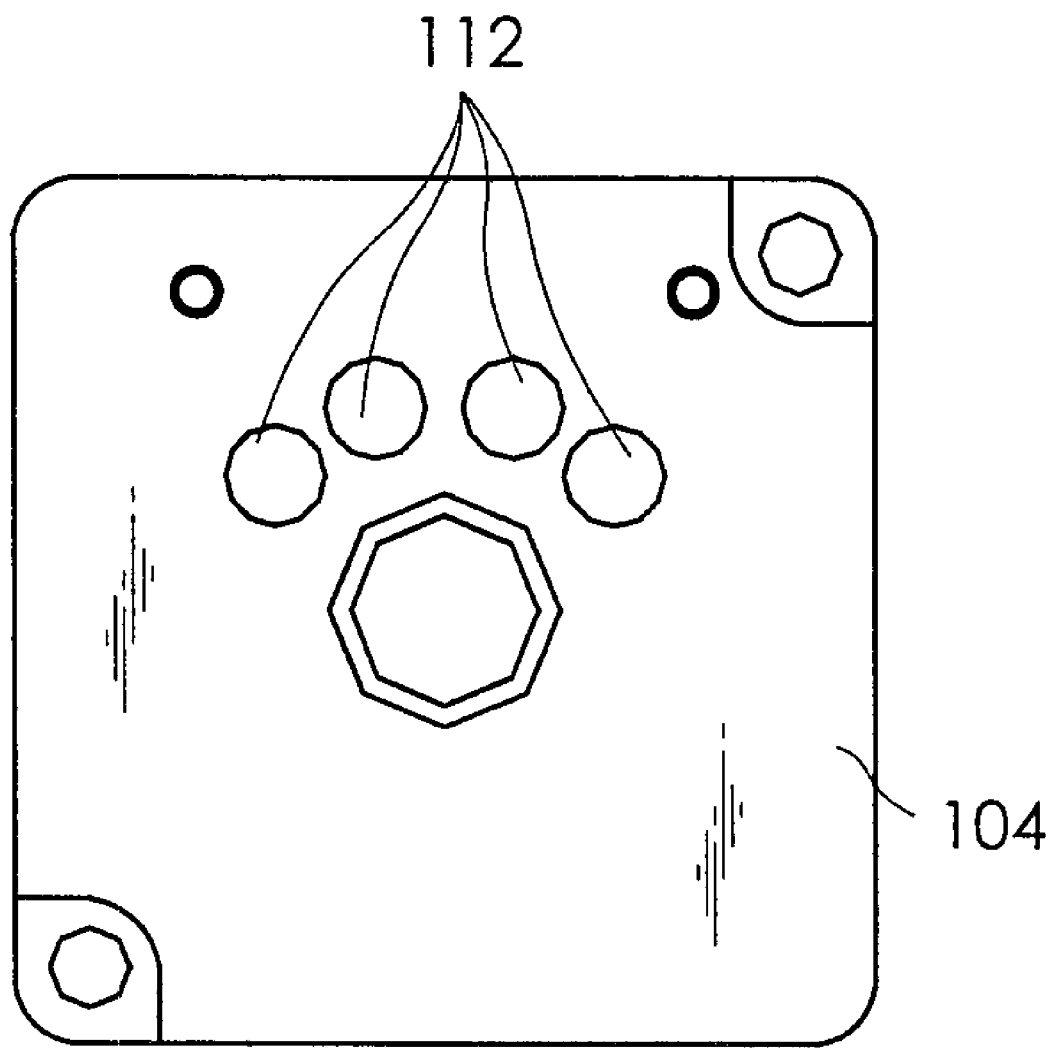
FIG. 7 is a plan view showing another example of the casing used in the present invention.

FIG. 7 is a plan view showing another example of the end cap used in the casing of the present invention. According to an end cap 104 shown in FIG. 7, a plurality of sensor receiving portions 112 corresponding to the number of the magnetic sensors 11 are formed as recesses on the outer wall portion of the end cap 104.

Although the above-mentioned embodiments showed examples in which the present invention is applied to a motor, the present invention is not limited to these embodiments and can be applied to a generator, a rotational position sensor, and the like.

Although two or more magnetic sensors 11 are arranged in the above-mentioned embodiments, only one magnetic sensor 11 may be disposed.

In each of the above-mentioned embodiments, the present invention is applied to a flat-type rotary electric machine (in which the axial dimension thereof is shorter than the radial dimension thereof), it is not limited to these embodiments, and needless to say, it is also applicable to a rotary electric machine in which the axial dimension thereof is longer than the radial dimension thereof. Further, the present invention is not limited to these embodiments, but various variations and modifications may be made without departing from the scope of the present invention.

What is claimed is:

1. A rotary electric machine comprising:
   a stator;
   a magnet rotor rotating about a rotation center line;
   one or more magnetic sensors for detecting leakage flux leaking out of the magnet rotor; and
   a casing receiving the magnet rotor and the stator,
   the one or more magnetic sensors being received in a sensor receiving portion that is formed in an outer wall portion of a side wall of the casing, the side wall being located in an extending direction of the rotation center line of the magnet rotor, the sensor receiving portion being formed by depressing the outer wall portion of the side wall to form a recess having a closed end,
   the sensor receiving portion being disposed in a position that allows the one or more sensors to detect leakage flux leaking out of the magnet rotor,
   the one or more magnetic sensors being mounted onto a circuit substrate in such a manner that the magnetic sensors may be received in the sensor receiving portion with the circuit substrate being attached to the outer wall portion.

2. The rotary electric machine according to claim 1, wherein a plurality of the magnetic sensors are disposed and the sensor receiving portion is provided for each of the magnetic sensors.

3. The rotary electric machine according to claim 1, wherein a plurality of the magnetic sensors are disposed, and the sensor receiving portion is provided for all of the magnetic sensors and is constituted by an arc-shaped recess centering on the rotation center line.

4. The rotary electric machine according to claim 1, wherein the casing is made of an insulating resin.

5. A flat-type electric motor comprising:
   a stator including a stator core and an excitation winding wound on the stator core;
   a magnet rotor disposed inside the stator core and rotating about a rotation center line;
   one or more magnetic sensors for detecting leakage flux leaking out of the magnet rotor; and
   a casing receiving the magnet rotor and the stator,
   the one or more magnetic sensors being received in a sensor receiving portion that is formed in an outer wall portion of a side wall of the casing, the side wall being located in an extending direction of the rotation center line of the magnet rotor, the sensor receiving portion being formed by depressing the outer wall portion of the side wall to form a recess having a closed end,
   the sensor receiving portion being disposed in a position that allows the one or more sensors to detect leakage flux leaking out of the magnet rotor,
   the one or more magnetic sensors being mounted onto a circuit substrate in such a manner that the magnetic sensors may be received in the sensor receiving portion with the circuit substrate being attached to the outer wall portion.

* * * * *